(12) United States Patent
Cotter

(10) Patent No.: US 6,199,838 B1
(45) Date of Patent: Mar. 13, 2001

(54) GAS SPRING FILLER VALVE

(75) Inventor: Jonathan P. Cotter, Dearborn, MI (US)

(73) Assignee: Diebolt International, Inc., Plymouth, MI (US)

( * ) Notice: Subject to any disclaimer, the term of this patent is extended or adjusted under 35 U.S.C. 154(b) by 0 days.

(21) Appl. No.: 09/179,335

(22) Filed: Oct. 27, 1998

(51) Int. Cl.$^7$ ...................................................... F16F 9/43
(52) U.S. Cl. ............................................................ 267/64.28
(58) Field of Search ........................... 267/64.11, 64.28; 137/234.5, 223

(56) References Cited

U.S. PATENT DOCUMENTS

| 2,862,515 | * | 12/1958 | Breichle ............................. | 137/234.5 |
| 4,016,900 | * | 4/1977 | Shipp et al. ........................ | 137/223 |
| 4,792,128 | * | 12/1988 | Holley ................................ | 267/118 |
| 5,172,892 | * | 12/1992 | Wallis ................................ | 267/119 |
| 5,275,387 | * | 1/1994 | Cotter et al. ...................... | 267/64.11 |

FOREIGN PATENT DOCUMENTS

| 3031026 | 3/1982 | (DE) . |
| 19520192 | 12/1996 | (DE) . |
| 0282626 | 9/1988 | (EP) . |
| 2190478 | 11/1987 | (GB) . |

* cited by examiner

Primary Examiner—Robert J. Oberleitner
Assistant Examiner—Bradley King
(74) Attorney, Agent, or Firm—Reising, Ethington, Barnes, Kisselle, Learman & McCulloch

(57) ABSTRACT

A gas spring has a casing defining a chamber constructed to be filled with a gas under pressure, a piston rod received in the chamber for reciprocation between extended and retracted positions and having a free end projecting beyond the casing, a gas fill passage formed in the casing and through which pressurized gas is admitted into the chamber and a filler valve disposed in the fill passage to selectively permit the flow of gas through the fill passage. The filler valve has a body with a passage formed therethrough, a valve seat defined in the passage between opposed ends of the body and a poppet received in the passage and engageable with the valve seat to selectively permit gas flow through the filler valve and hence through the fill passage of the gas spring casing. The filler valve body preferably has mechanical threads formed in its exterior and constructed to be mated with complementary threads in the gas fill passage to firmly and releasably hold the filler valve within the fill passage. Preferably, an O-ring carried by the valve body provides a gas-tight seal between the valve body and the fill passage within a generally cylindrical portion of the fill passage. The valve body preferably has one or more integral tabs which retain the poppet within the valve body in assembly.

14 Claims, 2 Drawing Sheets

GAS SPRING FILLER VALVE

FIELD OF THE INVENTION

This invention relates generally to gas springs and more particularly to filler valves for gas springs.

BACKGROUND OF THE INVENTION

Gas springs may be utilized to yieldably resist movement of a body, such as a clamping ring for a metal blank of a die in a press for forming sheet metal parts. The springs are generally constructed with an actuating rod connected to a piston slidably received in a cylinder having a chamber charged to a predetermined pressure with an inert gas, such as nitrogen. This provides a spring effect or cushion permitting the rod to yieldably move towards its retracted position when a force applied externally to the rod exceeds the opposing force produced by the gas in the chamber acting on the piston. The gas springs can be operated with an external source of gas or can be pre-charged and operated as a self-contained unit.

A valve received in a gas fill passage through the cylinder selectively communicates the chamber filled with pressurized gas with the exterior of the cylinder. The valve permits the compressed gas to be removed from the chamber when desired, enables the addition of compressed gas to the chamber and prevents the gas from leaking from the chamber when it is desired to maintain the pressurized gas in the chamber. Conventional valves used with gas springs have an intricately shaped body with a generally frusto-conical or tapered side wall portion which is constructed to mate with a complementary frusto-conical tapered portion of the gas fill passage in the cylinder to provide a seal between the valve and the cylinder to prevent leakage of the gas from the chamber. Due to the small size of conventional filler valves and the intricately shaped gas fill passage required with these valves, it is extremely difficult to accurately machine the gas fill passage to provide a sufficient seal between the tapered portions of the valve and the cylinder. Further, any scratching or scuffing of the tapered portion on the valve body or in the fill passage compromises or destroys the seal between them and requires replacement of the valve or the entire cylinder body.

Additionally, conventional valves have a threaded brass swivel which is rotatable relative to the valve body to permit the swivel to be rotatably received in complementary threads in the gas fill passage while the valve body is slidably engaged with the interior of the gas fill passage, substantially without rotation of the valve body, to prevent damage to the valve body as it is assembled into the fill passage. The brass swivel is fragile and can be over-torqued when the filler valve is assembled into the gas fill passage thereby jamming or distorting the brass swivel such that the filler valve cannot be removed from the fill passage without damaging it. Further, the brass swivel has a small number of very small threads which may be easily damaged or stripped when assembled into the fill passage, thereby destroying the valve and making it very difficult, if not impossible, to remove the filler valve from the fill passage.

SUMMARY OF THE INVENTION

A gas spring has a casing defining a chamber constructed to be filled with a gas under pressure, a piston rod received in the chamber for reciprocation between extended and retracted positions and having a free end projecting beyond the casing, a gas fill passage formed in the casing and through which pressurized gas is admitted into the chamber and a filler valve disposed in the fill passage to selectively permit the flow of gas through the fill passage. The filler valve has a body with a passage formed therethrough, a valve seat defined in the passage between opposed ends of the body and a poppet received in the passage and engagable with the valve seat to selectively permit gas flow through the filler valve and hence, through the fill passage of the gas spring casing. The filler valve body preferably has mechanical threads formed in its exterior and constructed to be mated with complementary threads in the gas fill passage to firmly and releasably hold the filler valve within the fill passage. Preferably, an O-ring carried by the valve body provides a gas-tight seal between the valve body and the fill passage within a generally cylindrical portion of the fill passage. The valve body preferably has one or more integral tabs which retain the poppet within the valve body in assembly.

The poppet preferably has a valve stem extending through the valve seat at least when the poppet is in its closed position and a valve head integral with the valve stem and constructed to engage the valve seat to prevent the flow of gas through the filler valve when the poppet is closed Preferably, an O-ring is disposed between the valve head and the valve seat to improve the seal between them. Also preferably, the poppet has an end portion extending from the valve head opposite the valve stem and constructed to project the beyond the valve body at least when the poppet is in its open position to engage a wall of the fill passage to limit the travel of the poppet towards its open position. The poppet is generally loosely received within the passage of the valve body and is normally in an open position. The pressure of the gas in the chamber of the gas spring exerts a force on the poppet moving the poppet to its closed position with the valve head firmly engaged with the valve seat to prevent the flow of gas through the filler valve. To open the filler valve, the valve stem is displaced from the opposite side of the valve seat to displace the valve head from the valve seat. With the poppet in its open position, gas may be removed or added to the chamber of the gas spring as desired.

Objects, features and advantages of this invention include providing a gas spring with a filler valve which has very few parts, has integral, durable threads, is larger than conventional valves to facilitate machining of the passage in which the valve is received, does not require an intricate passage to provide a seal between the filler valve and the gas spring, is rugged, reliable, durable, easy to assemble into and remove from a gas spring and of relatively simple design, economical manufacture and assembly.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
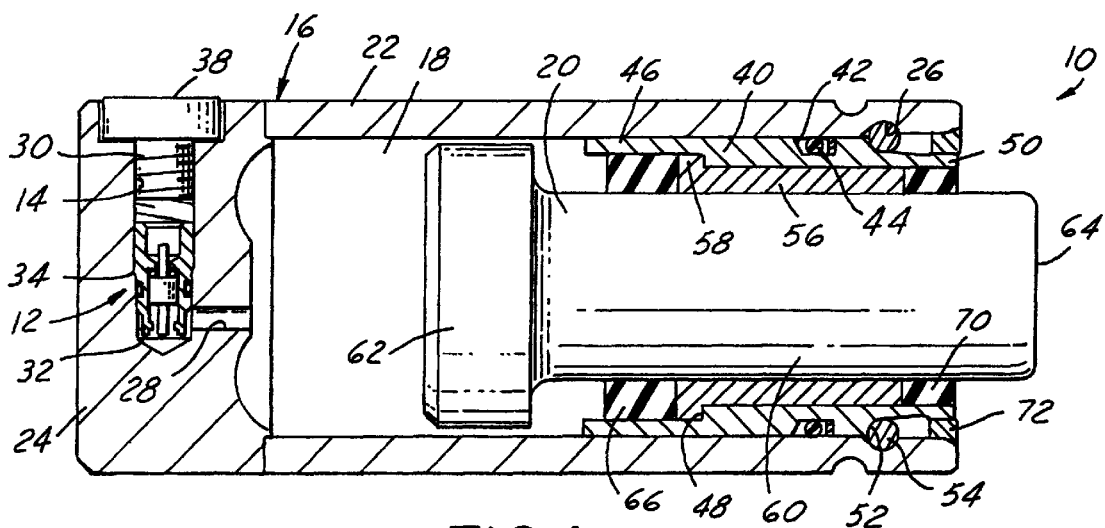
FIG. 1 is a cross-sectional view of a gas spring having a filler valve embodying this invention.

Referring in more detail to the drawings, FIG. 1 illustrates a gas spring 10 embodying this invention and having a filler valve 12 received in a gas fill passage 14 of a casing 16 of the gas spring 10 to permit the removal or addition of gas under pressure to a chamber 18 defined in part by the casing 16 and a piston rod 20 slidably received for reciprocation within the casing. The piston rod 20 may be moved by a body against the force of the pressurized gas in the chamber 18 to yieldably resist movement of the body.

Figure 4:
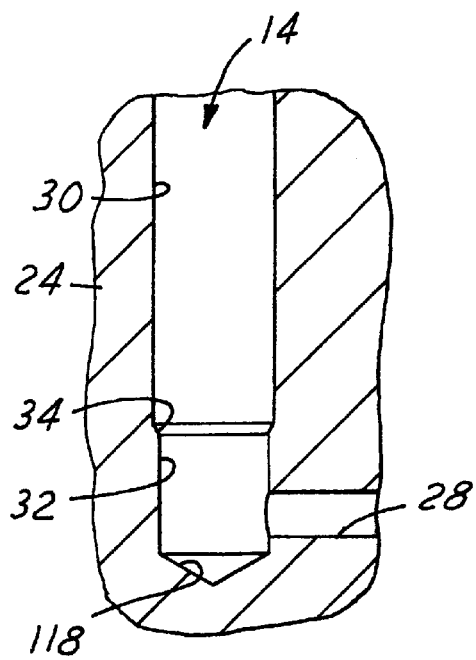
FIG. 4 is a fragmentary sectional view illustrating the construction of a gas fill passage of the gas spring of FIG. 1.

The casing 16 is an open-ended tubular member with a circumferentially continuous side wall 22 and a base cap 24 preferably welded to the side wall 22 and closing one end of the casing 16. The interior surface of the casing 16 has an annular groove 26 formed therein to provide a shoulder or stop surface. The gas fill passage 14 is formed in the base 24 of the casing 16 in communication with the exterior of the casing 16 at one end and with the chamber 18 through a transverse passage 28 at its other end. As best shown in FIG. 4, the gas fill passage 14 has a first portion 30 with a first diameter and a second portion 32 with a second diameter smaller than that of the first portion 30 to define a circumferentially continuous step or shoulder 34 in the gas fill passage 14. Both the first portion 30 and the second portion 32 are preferably generally cylindrical, of relatively large diameter and are formed by conventional drilling and reaming operations. Preferably the first portion 30 of the gas fill passage 14 has internal threads 36 extending substantially the entire length of the first portion 30. A plug 38 may be removably received in the first portion 30 of the gas fill passage 14 to close it and prevent direct access to the filler valve 12.

An annular housing 40 is received in the casing 16 and has a circumferentially continuous groove 42 formed in its exterior and constructed to receive a sealing member, such as an O-ring 44 to provide a gas-tight seal between the housing 40 and the casing 16 to prevent gas from leaking between them. An end portion 46 of the housing 40 having a larger inner diameter than the remainder of the housing 40 provides a circumferentially continuous shoulder 48 in the interior of the housing 40. At its opposite end 50, the housing 40 has a reduced diameter providing a radially outwardly extending shoulder 52 constructed to engage a retaining ring 54 received within the groove 26 in the interior wall of the casing 16 to retain the housing 40 within the casing 16.

An annular bearing 56 is received within the housing 40 encircling and closely adjacent the piston rod 20 to guide the piston rod 20 for axial reciprocation. The bearing 56 is preferably formed of sintered bronze impregnated with lubricant or of wear and friction resistant plastics, such as polyimides, ultra-high molecular weight (UHMW) materials, such as UHMW-polyethylene, polytetrafluoroethylene, and various fiber matrix and thermoplastic composites. To retain the bearing 56 within the housing 40, the bearing 56 has a radially outwardly extending flange 58 at one end constructed to engage the shoulder 48 of the housing 40.

The piston rod 20 is slidably received in the bearing 56 for reciprocation between retracted and extended positions and has an elongate shank 60 and an enlarged head 62 received in the chamber 18. The head 62 is preferably integral with the shank 60 and has a diameter greater than the inner diameter of the housing 40 to retain the piston rod 20 within the casing 16. The free end 64 of the piston rod 20 extends beyond the casing 16 at least when the piston rod 20 is in its extended position.

To prevent the gas from leaking between the piston rod 20 and the housing 40, an annular sealing member 66 is disposed in the housing 40 adjacent the bearing 56 and encircling and closely adjacent to the piston rod 20. The sealing member 66 preferably has an inner diameter slightly smaller than the outer diameter of the piston rod 20 and an outer diameter slightly larger than the inner diameter of the end portion 46 of the housing 40 such that the sealing member 66 is stretched around the piston rod 20 and compressed between the housing 40 and piston rod 20 to provide a gas-tight seal between the housing 40 and the piston rod 20.

To prevent contaminants from entering the gas spring 10 and fouling the sealing member 66 or bearings 56 therein, a wiper 70 is provided adjacent an outer end of the bearing 56 and is preferably carried by the housing 40. The wiper 70 is preferably an annular ring of a flexible and compressible elastomeric material and has an inner diameter slightly smaller than the outer diameter of the piston rod 20 to circumferentially engage and rub or wipe the piston rod 20 as it reciprocates. To also prevent contaminants from entering the gas spring 10, an annular dust cap 72 may be received in the open end of the casing 16 closing the gap between the housing 40 and the casing 16.

Figures 2, 3:
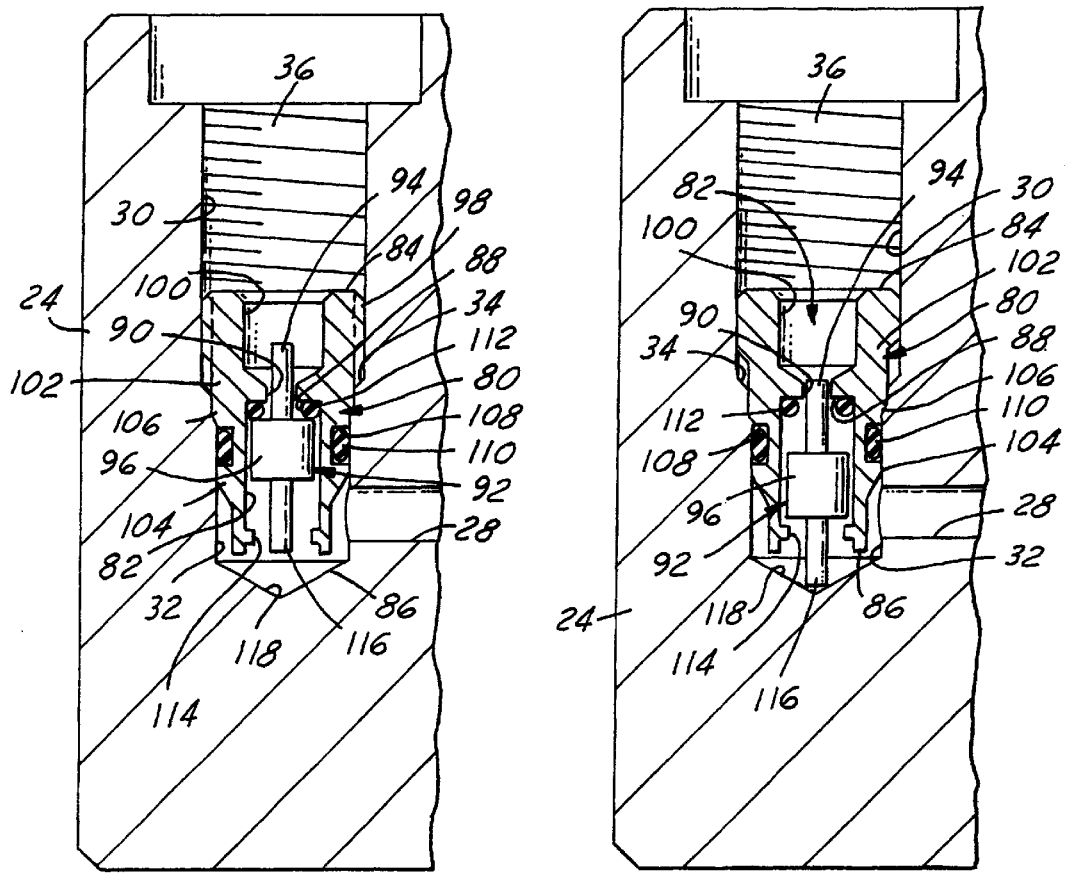
FIG. 2 is a fragmentary sectional view of the filler valve in its closed position.
FIG. 3 is a fragmentary sectional view of the filler valve in its open position.

As best shown in FIGS. 2 and 3, the filler valve 12 has a body 80 preferably made of steel with a through passage 82 defining opposed open ends 84,86 of the body 80. A valve seat 88 is disposed between the ends 84,86 of the body 80 and defines a valve opening 90. A poppet 92 is preferably slidably received in the passage 82 and is preferably carried by the valve body 80. The poppet 92 has a valve stem 94 constructed to be received within the valve opening 90 and an enlarged valve head 96 constructed to bear on the valve seat 88 to prevent the flow of gas through the valve opening 90 and hence, the passage 82 of the body 80 as well as the gas fill passage 14 of the casing 16. An O-ring 112 is preferably provided between the valve seat 88 and valve head 96 to improve the seal between them.

The valve body 80 preferably has relatively large diameter, integral threads 98 formed about its exterior surface adjacent one end 84 of the body 80 which are constructed to mate with complementary internal threads 36 in the gas fill passage 14 to facilitate assembly of and to retain the valve body 80 within the gas fill passage 14. A preferably hexagon shaped cavity 100 formed in one end 84 of the body 80 defines in part the passage 82 and is constructed to receive a complementary shaped tool (such as an Allen wrench) to rotate the valve body 80 for threaded engagement with gas fill passage 14. The valve body 80 has a first portion 102 inboard of its threaded end 84, a reduced diameter portion 104 extending from the first portion 102, and between them a frusto-conical circumferentially continuous shoulder 106. This shoulder 106 is constructed to mate with and bear on the shoulder 34 defined between the first and second portions 30,32 of the gas fill passage 14 to provide a positive stop and thereby limit the insertion of the filler valve into the gas fill passage 14. To provide a seal between the valve body 80 and the casing 16 within the gas fill passage 14, a circumferentially continuous groove 108 is formed in the reduced diameter portion 104 of the valve body 80 and is constructed to receive a sealing member, such as an O-ring 110. The O-ring 110 preferably has an outer diameter slightly greater than the diameter of the second portion 32 of the gas fill passage 14 and an inner diameter slightly smaller than the outer diameter of the valve body 80 within the groove 108 such that the O-ring 110 is stretched around the valve body 80 and compressed between the valve body and the gas fill passage 14 to provide a gas-tight seal between the valve body 80 and the gas fill passage 14.

Figure 5:
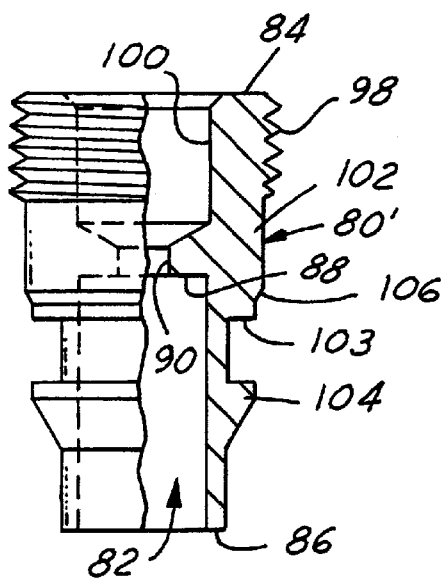
FIG. 5 is a cross-sectional view of a filler valve body prior to assembly of the filler valve.
Figure 6:
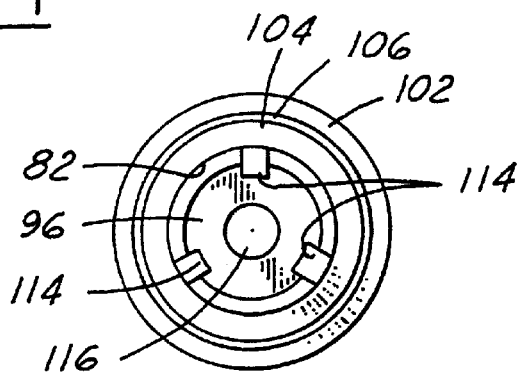
FIG. 6 is an end view of a filler valve.

As shown in FIG. 5, the end 86 of the valve body 80' opposite the threaded end 84 Is generally circumferentially continuous prior to assembly therein of the filler valve 12. After inserting the O-ring 112 and the poppet 92 into the end 86 of the body 80', circumferentially spaced portions of the valve body 80' are staked or sheared and bent inwardly, as best shown in FIG. 6, to provide generally radially inwardly extending tabs 114 constructed to be engaged by the valve head 96 and limit its movement away from the valve seat 88.

The poppet 92 has the valve stem 94 of reduced diameter constructed to be slidably received with clearance between them through the valve opening 90 and the enlarged valve head 96 constructed to bear on the valve seat 88 to close the valve opening 90. Preferably, the poppet 92 also has a reduced diameter end portion 116 extending from the valve head 96 opposite the valve stem 94 and between the tabs 114. The end portion 116 is constructed to project beyond the open end 86 of the valve body 80 at least when the poppet 92 is in its open position and to bear on a bottom surface 118 of the gas fill passage 14 to limit the travel of the poppet 92 and prevent the valve head 96 from engaging the tabs 114 and potentially becoming jammed in use. The poppet 96 is slidably received within the passage 82 of the valve body 80 between a closed position (FIG. 2) with the valve head 96 bearing on the valve seat 88 or preferably an O-ring 112 between the valve head 96 and valve seat 88, to prevent the flow of gas through the valve opening 90 and an open position (FIG. 3) with the valve head 96 spaced from the valve seat 88 and permitting the flow of gas through the valve opening 90.

To assemble the filler valve 12 into the gas fill passage 14 of the casing 16, a suitable tool, such as an Allen wrench, is inserted into the hexagon shaped cavity 100 and the valve body is threaded into the gas fill passage 14 until the shoulder 106 of the valve body 80 engages the shoulder 34 in the gas fill passage 14. This disposes the reduced diameter portion 104 of the valve body 80 and the O-ring 110 in the second portion 32 of the gas fill passage 14 to compress the O-ring 110 and provide a gas-tight seal between them.

To fill the chamber 18 with pressurized gas, a suitable nozzle is inserted into the gas fill passage 14 engaging the valve stem 94 to hold the poppet 92 in an open position with the valve head 96 spaced from the valve seat 88. Pressurized gas discharged from the nozzle flows into the passage 82, through the valve opening 90, around the valve stem 94 and valve head 96, through the transverse passage 28 and into the gas chamber 18. When the desired pressure of gas is reached in the chamber 18, the nozzle is removed from the gas fill passage 14 and the pressure of the gas in the chamber 18 exerts a force on the poppet 92 moving the poppet 92 to its closed position with the valve head 96 bearing on and compressing the O-ring 112 against the valve seat 88 to prevent the flow of gas through the valve opening 90. The plug 38 may then be inserted into the gas fill passage 14 to close the open end of the gas fill passage 14 if desired.

When it is desired to remove some or all of the gas from the chamber 18, the plug 38 is removed from the gas fill passage 14 and a tool is inserted into the cavity 100 to bear on the valve stem 94 and displace the poppet 92 to its open position permitting the flow of gas from the chamber 18, around the poppet 92 and through the valve opening 90. Even with pressures in the chamber of 2,000 psi or more, only a relatively small force, typically about 5 to 10 pounds, is required to move the poppet 92 to its open position.

Thus, the gas spring 10 has a filler valve 12 which is of a relatively large size, has very few components, does not require an intricate gas fill passage, and is extemely easy to assemble and to install in the gas fill passage 14 of the gas spring 10. Further, the large diameter, strong threads 98,36 of the filler valve 12 and casing 16 resist being stripped and the positive stop between the valve body shoulder 106 and gas fill passage shoulder 34 prevents over-torqueing of the filler valve 12 to prevent damage to the filler valve 12 and gas spring casing 16 and ensures that the filler valve 12 can be easily removed from the casing 16.

What is claimed is:

1. A gas spring comprising:
   a casing having a chamber therein for containing a gas under pressure, an annular wall defining an opening at one end of the chambers a base closing one end of the annular wall and a fill passage formed in the base and communicating the chamber with the exterior of the casing, said fill passage having a first portion with internal threads and leading to a second portion of smaller diameter than the first portion with a shoulder between the first portion and second portion;
   a rod received in the chamber for generally axial reciprocation therein and projecting from the chamber;
   a seal between the rod and the casing to substantially prevent the gas from leaking from the chamber around the rod; and
   a filler valve carried by the base of the casing within the fill passage and having a body with a complimentary externally threaded portion threaded into the first portion of the fill passage, a valve passage therethrough opening into opposed open ends of the body each communicating with the fill passage of the casing, a valve seat surrounding the valve passage between the opposed ends of the body, the valve passage having a valve opening through the valve seat,
   a poppet slidably received in the valve passage for reciprocation between an open position spaced from the valve seat and a closed position adjacent the valve seat to prevent the flow of gas from the chamber through the valve passage and the fill passage the poppet having a valve stem constructed to project through the valve opening through the valve seat at least when the poppet is in its closed position an enlarged valve head operably connected to the valve stem and engageable with the valve seat to close the valve opening and an end portion extending from the valve head opposite the valve stem, projecting through an open end of the body at least when the poppet is in its open position and constructed to bear on the casing from within the fill passage to limit the travel of the poppet, and
   a shoulder integral with the body between the opposed ends of the body and engageable with the shoulder in the fill passage to limit insertion of the filler valve into the fill passage,
   whereby the poppet is moved to its closed position solely by the force of pressurized gas in the chamber acting on the poppet to prevent gas from leaking from the chamber through the fill passage and the poppet may be moved to its open position to permit gas flow through the valve passage and hence, thorough the fill passage of the casing.

2. The gas spring of claim 1 which also comprises a sealing member carried by the body and constructed to provide a seal between the body and the fill passage to substantially prevent gas in the chamber from leaking between the body and the casing through the fill passage.

3. The gas spring of claim 1 wherein a sealing member is disposed between the poppet and the valve seat to improve the seal between them when the poppet is in its closed position.

4. The gas spring of claim 3 wherein the sealing member is an o-ring.

5. The gas spring of claim 2 wherein the sealing member is an o-ring.

6. The gas spring of claim 2 wherein the body has an annular groove formed in its exterior between its ends and the o-ring is received in the groove.

7. A filler valve for a gas spring having a casing with a fill passage comprising:
- a body with a passage therethrough, an externally threaded first portion, a second portion axially inward of the first portion and of smaller diameter than the first portion, an integral frusto-conical shoulder between the first portion and second portion and opposed open ends of the body each communicating with the fill passage of the casing,
- a valve seat surrounding the passage defined in the body and disposed between the opposed ends of the body, and
- a poppet slidably received in the passage for reciprocation between an open position spaced from the valve seat and a closed position adjacent the valve seat to prevent the flow of gas through the passage and the fill passage, the poppet has a valve head engageable with the valve seat and a valve stem extending from the valve head and constructed to project through the valve seat at least when the poppet is its closed position, an end portion extending from the valve head opposite the valve stem, projecting through an open end of the body at least when the poppet is in its open position and constructed to bear on the casing from within the fill passage to limit the travel of the poppet,
- whereby the poppet is constructed to be moved to its closed position solely by the force of pressurized gas in the gas spring acting on the poppet to substantially prevent gas from leaking from the gas spring through the passage and the poppet may be moved to its open position by displacing the valve stem of the poppet projecting through the valve seat to displace the valve head from the valve seat.

8. The filler valve of claim 7 wherein the body has a tab extending into the passage and constructed to retain the poppet within the body.

9. The filler valve of claim 8 wherein the tab is formed by cutting and folding into the passage a portion of the body after the poppet is received in the passage with the tab constructed to be engaged by the valve head opposite the valve seat to retain the poppet in the passage of the body.

10. The filler valve of claim 7 which also comprises a sealing member carried by the body and constructed to provide a seal between the body and a passage in which the filler valve is received.

11. The filler valve of claim 7 wherein a sealing member is disposed between the valve head and the valve seat to improve the seal between them when the poppet is in its closed position.

12. A gas spring comprising:
- a casing having a chamber therein for containing a gas under pressure, an annular wall defining an opening at one end of the chamber, a base closing one end of the annular wall and a fill passage formed in the base and communicating the chamber with the exterior of the casing, said fill passage having a first portion with internal threads and leading to a second portion of smaller diameter than the first portion with a shoulder between the first portion and second portion;
- a rod received in the chamber for generally axial reciprocation therein and projecting from the chamber;
- a seal between the rod and the casing to substantially prevent the gas from leaking from the chamber around the rod; and
- a filler valve carried by the base of the casing within the fill passage and having a body with a complimentary externally threaded portion threaded into the first portion of the fill passage, a valve passage therethrough opening into opposed open ends of the body each communicating with the fill passage of the casing, a valve seat surrounding the valve passage between the opposed ends of the body,
- a poppet slidably received in the valve passage for reciprocation between an open position spaced from the valve seat and a closed position adjacent the valve seat to prevent the flow of gas from the chamber through the valve passage and the fill passage,
- a tab carried by the body, extending into the valve passage and constructed to retain the poppet within the body,
- the poppet having a valve head and an end portion which extends through an open end of the body at least when the poppet is in its fully open position and engages the casing to prevent engagement of the valve head and the tab, and
- a shoulder integral with the body between the opposed ends of the body and engageable with the shoulder in the fill passage to limit insertion of the filler valve into the fill passage,
- whereby the poppet is moved to its closed position solely by the force of pressurized gas in the chamber acting on the poppet to prevent gas from leaking from the chamber through the fill passage and the poppet may be moved to its open position to permit gas flow through the valve passage and hence, through the fill passage of the casing.

13. The gas spring of claim 12 wherein the tab is formed by cutting and folding into the passage a portion of the body after the poppet is received in the passage with the tab constructed to be engaged by the poppet to retain the poppet in the passage of the body.

14. A filler valve for a gas spring having a casing with a fill passage comprising:
- a body with a passage therethrough, an externally threaded first portion, a second portion axially inboard of the first portion and of smaller diameter than the first portion, an integral shoulder between the first portion and second portion, and opposed open ends of the body each communicating with the fill passage of the casing,
- a valve seat surrounding the passage through the body and disposed between the opposed ends of the body, and a poppet having a head slidably received in the passage for reciprocation between an open position spaced from the valve seat and a closed position bearing on the valve seat to prevent the flow of gas through the passage and the fill passage, a tab carried by the body to retain the head in the passage through the body, an end portion of the poppet extending from the head and which extends through an open end of the body at least when the head of the poppet is in its fully open position and engages the casing to prevent engagement of the head and the tab, and the poppet is constructed to be moved to its closed position solely by the force of pressurized gas in the gas spring acting on the poppet to substantially prevent gas from leaking from the gas spring through the passage.

* * * * *

UNITED STATES PATENT AND TRADEMARK OFFICE
CERTIFICATE OF CORRECTION

PATENT NO. : 6,199,838 B1
DATED : March 13, 2001
INVENTOR(S) : Jonathan P. Cotter Page 1 of 1

It is certified that error appears in the above-identified patent and that said Letters Patent is hereby corrected as shown below:

<u>Column 6,</u>
Line 21, delete "chambers" and insert -- chamber, --.
Line 46, after "passage" (second occurrence), insert -- , --.
Line 49, after "position" insert -- , --.
Line 51, after "opening" insert -- , --.
Line 66, delete "thorough" and insert -- through --.

Signed and Sealed this

Thirtieth Day of October, 2001

Attest:

NICHOLAS P. GODICI
Attesting Officer     Acting Director of the United States Patent and Trademark Office